United States Patent
Lin et al.

(10) Patent No.: US 9,069,573 B2
(45) Date of Patent: Jun. 30, 2015

(54) METHOD FOR GENERATING REDUCED SNAPSHOT IMAGE FOR BOOTING AND COMPUTING APPARATUS

(71) Applicant: INDUSTRIAL TECHNOLOGY RESEARCH INSTITUTE, Hsinchu (TW)

(72) Inventors: You-Ching Lin, Hsinchu County (TW); Kuo-Hung Lin, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 274 days.

(21) Appl. No.: 13/887,451

(22) Filed: May 6, 2013

(65) Prior Publication Data

US 2014/0082341 A1    Mar. 20, 2014

(30) Foreign Application Priority Data

Sep. 19, 2012    (TW) .............................. 101134245 A

(51) Int. Cl.
G06F 9/44    (2006.01)

(52) U.S. Cl.
CPC .............. G06F 9/442 (2013.01); G06F 9/4418 (2013.01)

(58) Field of Classification Search
CPC ........ G06F 9/4418; G06F 9/442; G06F 9/461
See application file for complete search history.

(56) References Cited

U.S. PATENT DOCUMENTS

| 6,438,668 B1 | 8/2002 | Esfahani et al. | |
| 6,609,182 B1 | 8/2003 | Pedrizetti et al. | |
| 7,624,260 B2 * | 11/2009 | Ethier et al. | 713/2 |
| 8,578,144 B2 * | 11/2013 | Bower et al. | 713/2 |
| 2007/0112899 A1 | 5/2007 | Edwards et al. | |
| 2007/0130482 A1 * | 6/2007 | Dahan et al. | 713/300 |
| 2011/0055541 A1 | 3/2011 | Lee et al. | |

(Continued)

FOREIGN PATENT DOCUMENTS

| JP | 2009132708 | 6/2009 |
| TW | 544628 | 8/2003 |

(Continued)

OTHER PUBLICATIONS

English Abstract translation of TWI375912 (Published Nov. 1, 2012).

(Continued)

*Primary Examiner* — Thuan Du
(74) *Attorney, Agent, or Firm* — McClure, Qualey & Rodack, LLP

(57) ABSTRACT

Method for generating a reduced snapshot image for booting and a computing apparatus are provided. An embodiment of the method includes the following. In response to a shutdown request, it is determined whether a specific boot mode is enabled. When the specific boot mode is enabled, a threshold parameter set for process killing is assigned. If a first memory unit of the computing apparatus has at least one process satisfying a process killing condition, the at least one process satisfying the process killing condition is killed. The process killing condition includes a criterion based on the threshold parameter set. A hibernation process is entered, wherein the hibernation process generates a snapshot image for booting and stores the snapshot image in a second memory unit of the computing apparatus and the snapshot image includes at least one process reserved in the first memory after the killing step.

20 Claims, 5 Drawing Sheets

(56) References Cited

U.S. PATENT DOCUMENTS

2012/0089825 A1*   4/2012   Jung et al. .................... 713/2
2013/0232360 A1*   9/2013   Chen et al. .................... 713/323

FOREIGN PATENT DOCUMENTS

TW          201111966          4/2011
TW          I375912            11/2012

OTHER PUBLICATIONS

English Abstract translation of TW201111966 (Published Apr. 1, 2011).
English Abstract translation of TW544628 (Published Aug. 1, 2003).
English Abstract translation of JP2009132708 (Published Jun. 18, 2009).
Baik, et al.: "Boosting up Embedded Linux device: experience on Linux-based Smartphone"; 2010 Linux Symposium.
Bai, et al.: "Design and Implementation of an Instantaneous Turning-on Mechanism for PCs"; IEEE Transactions on Consumer Electronics, vol. 53, No. 4, Nov. 2007.
Lo, et al.: "Swap-before-Hibernate: A Time Efficient Method to Suspend an OS to a Flash drive"; SAC'10, Mar. 22-26, 2010, Sierre, Switzerland. Copyright 2010.
Jo, et al.: "Optimizing the Startup Time of Embedded Systems: A Case Study of Digital TV"; IEEE Transactions on Consumer Electronics, vol. 55, No. 4, Nov. 2009.
Singh, et al.: "Optimizing the Boot Time of Android on Embedded System"; 2011 IEEE 15th International Symposium on Consumer Electronics.
Joe, et al.: "Bootup Time Improvement for Embedded Linux using Snapshot Images Created on Boot Time"; Next Generation Information Technology (ICNIT), 2011 The 2nd International Conference; Jun. 21-23, 2011.

* cited by examiner

METHOD FOR GENERATING REDUCED SNAPSHOT IMAGE FOR BOOTING AND COMPUTING APPARATUS

This application claims the benefit of Taiwan application Serial No. 101134245, filed Sep. 19, 2012, the disclosure of which is incorporated by reference herein in its entirety.

TECHNICAL FIELD

The disclosed embodiments relate to a method for generating a reduced snapshot image for booting and a computing apparatus.

BACKGROUND

In a shutdown process under a boot mode (e.g., a fast-boot mode) based on hibernation, all statuses of the system need to be stored as a snapshot image in an external memory. The resume process of such a huge image that records all system statuses is very time-consuming. Certain conventional approaches solve the problem by reducing size of the snapshot image. Dirty pages are written to a swap partition in an external memory during a shutdown process of a hibernation-based fast-boot mode, and the remainder memory contents are then written to the external memory as a snapshot image which is much smaller. Only loading a working set is needed in the boot process of a fast-boot mechanism. The related publications and patents are all based on a standard hibernation mechanism in Linux.

When generating a snapshot image in a shutdown process in a hibernation-based fast-boot mode, such fast-boot mechanism writes swappable pages to a swap space of an external memory by using a Linux memory management mechanism. Further, processes of related applications enabled after booting will load pages needed for executing the processes by a demanding page method. However, the above approach involves frequent and complicated I/O operations with external storage devices during shutdown, resulting in a long shutdown time, probably.

SUMMARY

The disclosure is directed to a method for generating a reduced snapshot image for booting and a computing apparatus.

According to one embodiment, a method for generating a reduced snapshot image for booting is provided. The method is applied to a computing apparatus, and includes the following steps. In response to a shutdown request, it is determined whether a specific boot mode is enabled. When the specific boot mode is enabled, a threshold parameter set for process killing is assigned. If a first memory unit of the computing apparatus has at least one process satisfying a process killing condition, the at least one process satisfying the process killing condition is killed. The process killing condition includes a criterion based on the assigned threshold parameter set. A hibernation process is entered. The hibernation process generates a snapshot image for booting and stores the snapshot image to a second memory unit of the computing apparatus. The snapshot image includes at least one process reserved in the first memory unit after the killing step.

According to another embodiment, a computing apparatus readable storage medium is provided. The recording medium includes a plurality of executable instructions. When a computing apparatus executes the instructions, the instructions cause the computing apparatus to perform the method for generating a reduced snapshot image for booting of the foregoing embodiment.

According to an alternative embodiment, a computing apparatus is provided. The computing apparatus includes a first memory unit, a second memory unit and a processing unit. In response to a shutdown request, the processing unit assigns a threshold parameter set for process killing when a specific boot mode is enabled. When the first memory unit of the computing apparatus has at least one process satisfying a process killing condition, the processing unit kills the at least one process satisfying the process killing condition. The process killing condition includes a criterion based on the assigned threshold parameter set. In response to the shutdown request, the processing unit enables the computing apparatus to enter a hibernation state. Before the computing apparatus enters the hibernation state, the processing unit generates a snapshot image for booting and stores the snapshot image to the second memory unit. The snapshot image includes at least one process reserved in the first memory unit after the processing unit kills the at least one process satisfying the process killing condition.

Figure 1:
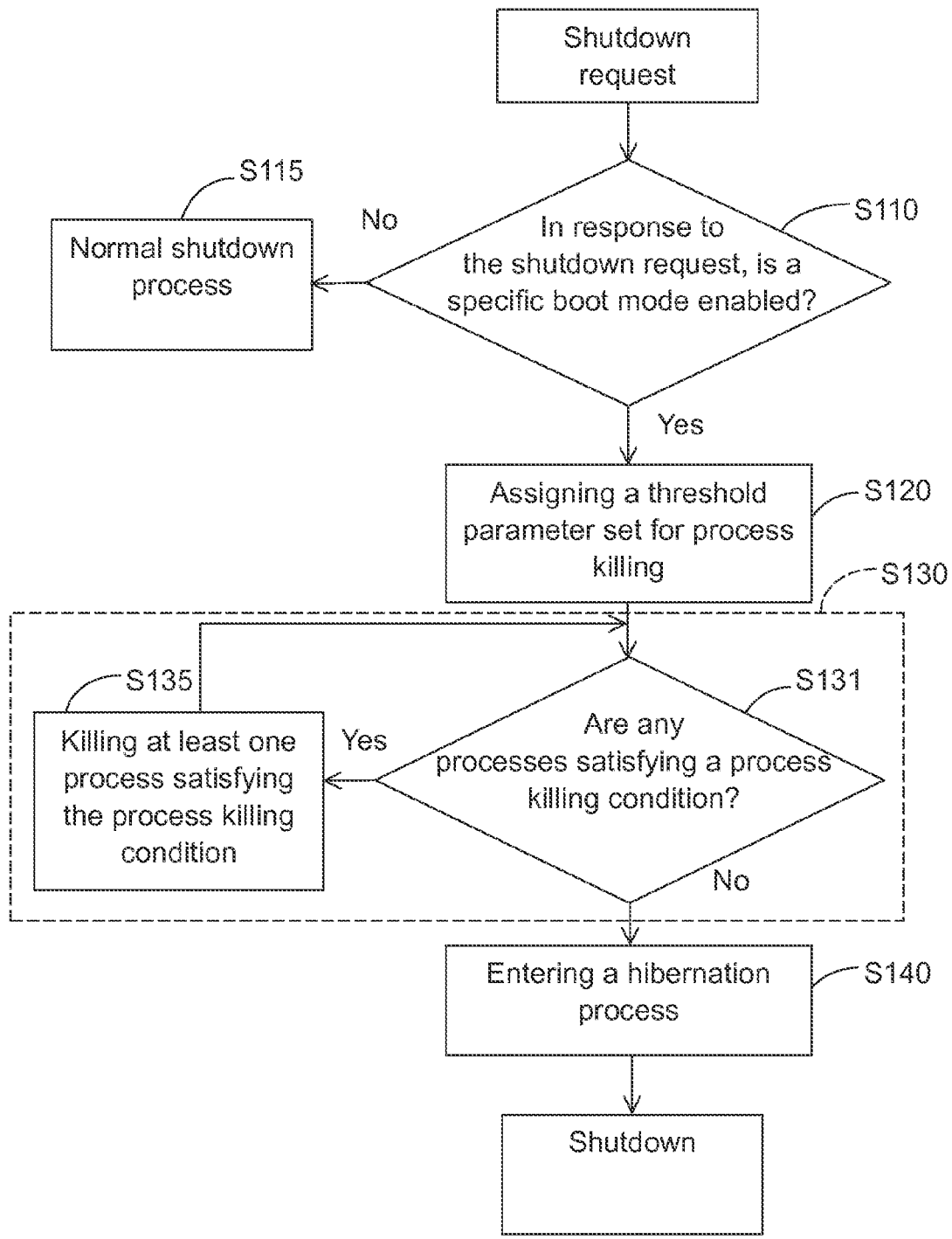
FIG. 1 is a flowchart of a method for generating a reduced snapshot image for booting according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The embodiments are directed to a method for generating a reduced snapshot image for booting and a computing apparatus. In some embodiments, a snapshot image having a reduced data amount can be generated so that a computing apparatus is allowed to boot by use of the reduced snapshot image. In other embodiments, according to a process list, the snapshot image reserves processes specified in the process list so that the specified processes can be immediately utilized after booting. In yet other embodiments, approaches for designating the process items in the process list are further disclosed, e.g., through statistics or designation by a user interface.

Figure 2:
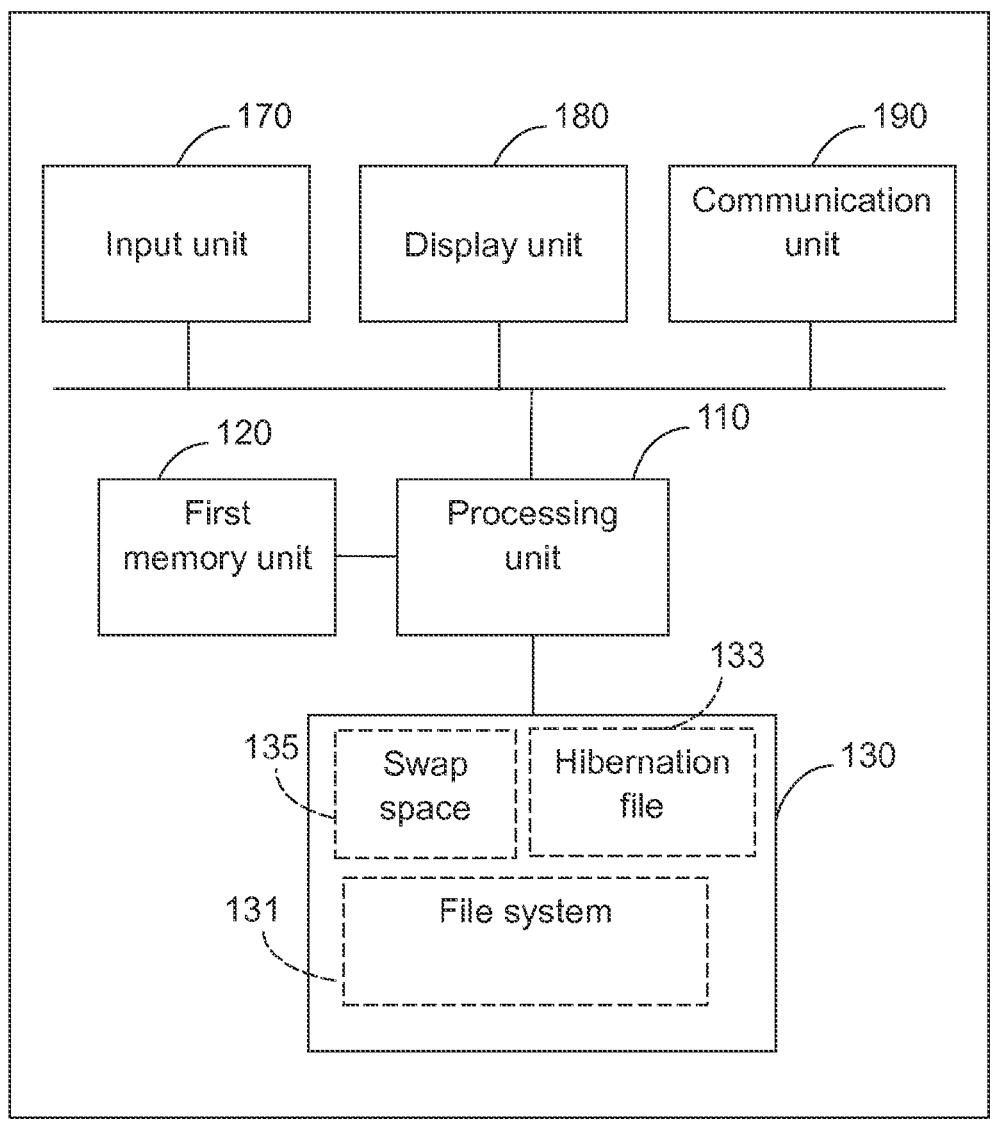
FIG. 2 is a computing apparatus according to one embodiment.

FIG. 1 is a flowchart of a method for generating a reduced snapshot image for booting according to one embodiment. The method is applicable to various computing apparatuses including computers, mobile devices, and embedded systems. For example, referring to FIG. 2, a computing apparatus 10 includes a processing unit 110, a first memory unit 120 (e.g., a main memory or a volatile memory such as a RAM and so on), and a second memory unit 130 (e.g., a secondary memory or a non-volatile memory such as a flash or a hard disk and so on). The second memory unit 130 stores, for example, a system file 131, a hibernation file (or a snapshot image) 133 and a swap space 135. Further, the computing apparatus 10 may selectively include other elements, e.g., an input unit 170, a display unit 180 (e.g., a display device or a touch screen) and a communication unit 190 (e.g., supporting at least one of wired, wireless, or broadband communication modes such as: 2G, 3G, LTE, 4G, WiFi, and GPS) for implementing different requirements of such as a smart phone, a tablet computer, a smart TV, a multimedia player, a laptop computer, an automobile computer and a desktop computer. The computing apparatus 10 has a specific boot mode in addition to a normal boot mode and a normal shutdown mode. The specific boot mode indicates that, in a boot process, a snapshot image or a hibernation file generated by a previous hibernation process is restored. The snapshot image or hibernation file includes contents sufficient for restoring normal operation, such as contents including system processes, particular user processes (e.g., desktop management processes), and other contents that need to be restored (e.g., configuration parameters for hardware in the computing apparatus). The steps of the embodiments below can be performed by the processing unit 110 of the computing apparatus 10. In addition, the first memory unit 120 and the second memory unit 130 could be implemented at different memory modules.

Referring to FIG. 1, as shown in step S110, in response to a shutdown request (e.g., initiated by a user or generated by a system of a computing apparatus), a computing apparatus determines whether a specific boot mode is enabled. Step S110 may also be regarded as performing the determination when the computing apparatus is in a shutdown process. When the specific boot mode is not enabled, a normal shutdown process is entered, as indicated in step S115. When it is determined that the specific boot mode is enabled, a threshold parameter set for process killing is assigned, as indicated in step S120. In step S130, a process killing step is performed. If a first memory unit of the computing apparatus has at least one process satisfying a process killing condition, the at least one process satisfying the process killing condition is killed. The process killing condition includes a criterion based on the assigned threshold parameter set. Step S140 is performed after the killing step to enter a hibernation process. The hibernation process generates a snapshot image for booting and stores the snapshot image to a second memory unit of the computing apparatus. The snapshot image at least includes processes reserved in the first memory unit after the killing step, e.g., a system process such as a kernel process and a specific user process such as a desktop management process. When the hibernation process ends, the computing apparatus enters a hibernation state and shuts down.

In the above embodiment, the killing step in step S130 may be implemented by different approaches. For example, in step S131, it is determined whether a first memory unit has at least one process satisfying a process killing condition. Step S135 is performed to kill the at least one process satisfying the process killing condition, or else another step is performed when the first memory unit has no process satisfying the process killing condition.

Thus, the threshold parameter set assigned in step S120 can enable a reduction of a size of the snapshot image generated by the hibernation process. For example, Table-1 shows statuses of active processes in the first memory unit of the computing apparatus. In Table-1, process properties, priorities and active memory sizes of processes $P_N$ to $P_{N+10}$ in the first memory unit are listed. The processes $P_N$ to $P_{N+2}$ are system processes with highest priorities (e.g., represented by 0), while other processes are user processes with lower priorities (e.g., represented by 6, 12 and 18). The last row in Table-1 indicates that the free memory size is 60 MB. For example, the threshold parameter set assigned in step S120 includes threshold parameters such as a priority threshold (e.g., a system alert threshold). When performing the killing step in step S130, the at least one process satisfying the process killing condition is killed with respect to the priority (e.g., a process with a lower priority having a priority value of greater than 0), and processes with priorities that do not satisfy the process killing condition are reserved. Thus, after step S130, the processes with priority values above 0 are all removed, such that the free memory size is increased to 85 MB while the active memory size is reduced to 15 MB. The snapshot image generated in step S140 at least includes the processes reserved in the first memory after step S130, i.e., the size of the snapshot image is at least 15 MB. In contrast, if step S130 is not performed, a snapshot image generated according to the active memory is of a size of at least 40 MB. In this case of application of embodiment in FIG. 1 to the example in Table 1, the size of the snapshot image obtained is significantly reduced by 62.5%.

TABLE 1

| Process property | Priority | Process | Active memory (MB) |
| --- | --- | --- | --- |
| System | 0 | $P_N$ | 5 |
| System | 0 | $P_{N+1}$ | 5 |
| System | 0 | $P_{N+2}$ | 5 |
| User | 6 | $P_{N+4}$ | 5 |
| User | 6 | $P_{N+5}$ | 5 |
| User | 12 | $P_{N+6}$ | 5 |
| User | 12 | $P_{N+7}$ | 2 |
| User | 12 | $P_{N+8}$ | 2 |
| User | 18 | $P_{N+9}$ | 3 |
| User | 18 | $P_{N+10}$ | 3 |
| Free | N/A | N/A | (Free memory size) 60 |

Further, the threshold parameter set may represent at least one threshold parameter or a combination of parameters of different properties, e.g., the priority threshold in the foregoing example. In another embodiment, a memory threshold included in the assigned threshold parameter set may also serve as a criterion for defining the process killing condition. Taking Table-1 for example, a condition may be defined as: only reserving processes with a priority value 0 (or smaller than a specific priority value, for example) when the current free memory size is less than a memory threshold (e.g., 64 MB). That is, the process killing condition results in killing all processes with priority values that are not 0 (or not smaller than a specific priority value, for example).

In another embodiment, the computing apparatus may implement the method in FIG. 1 by adopting a memory killer in an operating system. For example, "out of memory killer" in a Linux operating system or "low memory killer" in an Android operating system may be employed, wherein these memory killers utilize threshold parameter sets with multiple sets of parameters for defining criteria for the process killing condition. Taking the Android operating system for example, minimum values of "oom_adj" (similar to the priority values) such as "0, 8" are set in "/sys/module/lowmemorykiller/parameters/adj" and the allowed amount of free pages (e.g., "1024, 4096") are stored in "/sys/module/lowmemorykiller/parameters/minfree," wherein all the values are spaced by a comma and arranged in an ascending order.

Table-2 shows an example of threshold parameter sets referred to by a memory killer of a computing apparatus under a normal operating state. For example, a first threshold parameter set is for normal operation, and includes multiple sets of parameters, e.g., three sets of parameters. For example, a memory alert value of 64 indicates that when the memory killer detects that the free memory size in the system drops to 64 MB, the memory killer kills processes with priority values greater than 18 (i.e., lower priorities). Details for other parameter values can be deduced similarly. In comparison, a second threshold parameter set is for reduction of the snapshot image size, and has system alert thresholds {0, 1, 1}. That is, the second threshold parameter set implies that the memory killer may substantially kill all processes with lower priorities regardless of the free memory size.

Further, step S120 may be implemented by different approaches in the embodiments utilizing the memory killer of the operating system. For example, when it is determined that the specific boot mode is enabled, a system process modifies the threshold parameter set (which may be stored in one or multiple files, or may be hardcoded in source codes) utilized by the memory killer. For example, the system alert thresholds of the foregoing first threshold parameter set are changed from {0, 6, 18} to {0, 1, 1}. For another example, the system alert values of the first threshold parameter set are changed from {16, 32, 64} to {64, 0, 0}. Since the free memory size cannot be zero and 64 MB is the maximum capacity of the current main memory, any amount of current free memory size will be under the situation of the memory alert value of 64 MB. Thus, such a change substantially enables all processes except system processes to be removed. For another example, a system application is executed to replace the file(s) storing the first threshold parameter set by one or more files storing the second threshold parameter set. For another example, modification of the original approach with respect to the memory killer can be made such that at least two threshold parameter sets, e.g., as the parameters shown in Table-2, are included in the file or data structure for threshold parameter set used by the memory killer. The memory killer can then be notified to switch to the second threshold parameter set as the criterion for defining the process killing condition, e.g., by transmitting a signal or a flag or through other manners, which may be regarded as implementing the assigning step in step S120.

TABLE 2

| Purpose | Threshold parameter | |
|---|---|---|
| | System alert threshold (priority value) | Memory alert value (free memory in MB) |
| 1. Normal operation | 0 | 16 |
| | 6 | 32 |
| | 18 | 64 |
| 2. Reduction of snapshot image size | 0 | 16 |
| | 1 | 32 |
| | 1 | 64 |

In short, any implementation that enables step S130, as executed, to obtain the criterion for defining the process killing condition can be regarded as the realization of the assigning step in step S120. For example, in an embodiment, a system process different from the original memory killer in the operating system is implemented to realize the method shown in FIG. 1, wherein the file (or data structure) for threshold parameter set read by the system process stores only one threshold parameter set for reduction of snapshot image size. Although this embodiment does not involve the operations of changing, modifying, or switching the threshold parameter sets as the foregoing embodiment in which the memory killer of the operating system is utilized, the threshold parameter set is in equivalence assigned as the criterion for defining the process killing condition is obtained.

Therefore, apart from calling the memory killer in the operating system to perform step S130, step S130 may also be realized by other application implementations or by other system applications with modifications for this purpose. In an embodiment, for example, for current processes (or for other processes except for system processes, such as user processes), it is determined whether the priority values of the processes satisfy the criterion based on the assigned threshold parameter set (e.g., whether the priority value is smaller than a threshold) so as to determine whether the processes are to be killed. In another example, the determination begins from the one of the processes with a lowest priority (e.g., a greatest priority value). A process satisfying the process killing condition (e.g., the priority value is greater than the threshold) is killed until all remaining processes satisfy the criterion. In this way, the method for generating a reduced snapshot image for booting according to the embodiments of the disclosure can be implemented in any operating systems, such as the operating systems based on Unix and Linux, Windows and Windows Phone of Microsoft, OS X and iOS of Apple, and other embedded systems, in addition to the Linux or Android operating systems.

In another embodiment, a whitelist, or referred to as a process list, may be further utilized to prevent the processes in the process list from being killed when step S130 in the embodiment in FIG. 1 is performed. The process list may record identification or any indications for processes to be reserved in the snapshot image, e.g., process names and/or paths.

Figure 3:
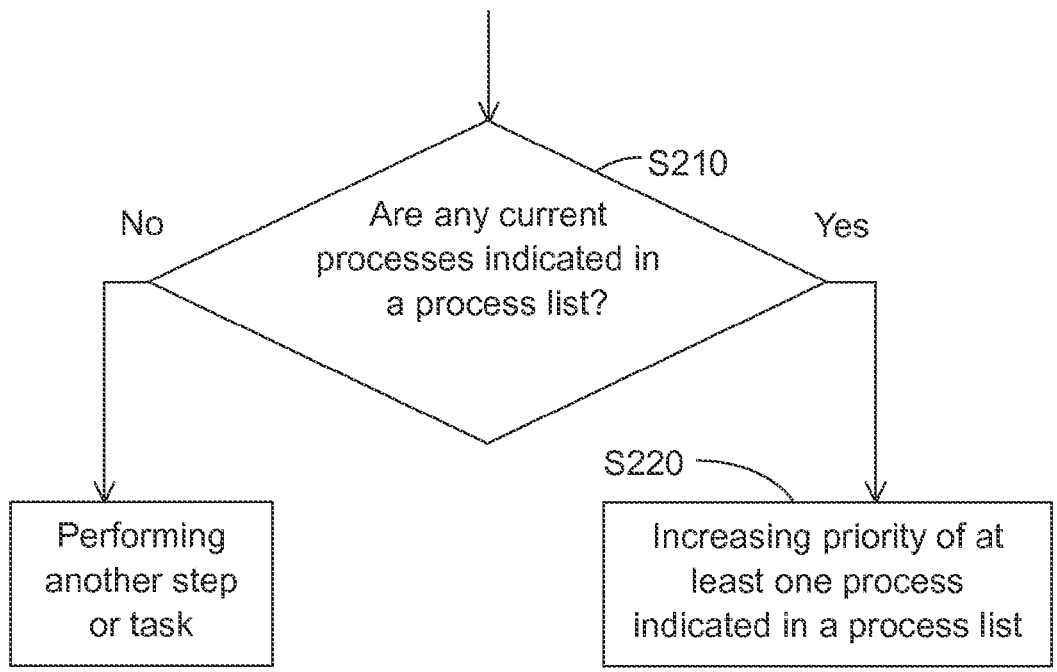
FIG. 3 is a process for utilizing a process list in the method in FIG. 1 according to one embodiment.

Referring to FIG. 3, in step S210, it is determined whether any of the current processes of the computing apparatus are indicated in a process list. In step S220, the priority of at least one current process indicated in the process list is increased, if any. For example, step S220 may be implemented as increasing the priority of at least one current process so that the at least one process with the increased priority is reserved in the snapshot image after the killing step. For example, assume that processes with priority values greater than 1 are killed in step S130, and a process A is specified in the process list. Thus, in step S220, the priority of the process A is increased by changing its priority value from 16 to 1. Further, step S220 may also be implemented as making the priority value of the at least one current process equal to the priority value of a system kernel process (e.g., with a priority value of 0), so that the at least one current process can be reserved in the snapshot image after step S130.

Figure 4:
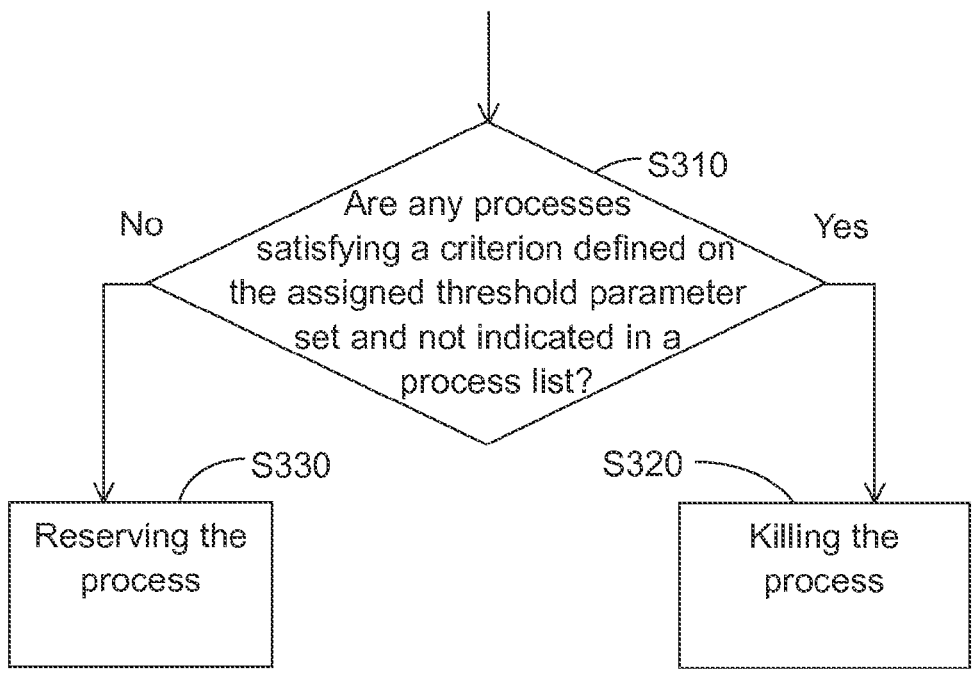
FIG. 4 is a process for utilizing a process list in the method in FIG. 1 according to another embodiment.

Referring to FIG. 4, in an embodiment of step S130, the process killing condition further includes a criterion based on a process list. As shown in step S310, it is determined whether a process in the first memory unit of the computing apparatus satisfies a criterion based on the assigned threshold parameter set and is not indicated in the process list. If so, step S320 is performed to kill the process. If not, the process is reserved, as indicated in step S330.

Further, in other embodiments, a method for generating a reduced snapshot image for booting further includes a step of designating process items or entries indicative of processes in a process list.

Figure 5:
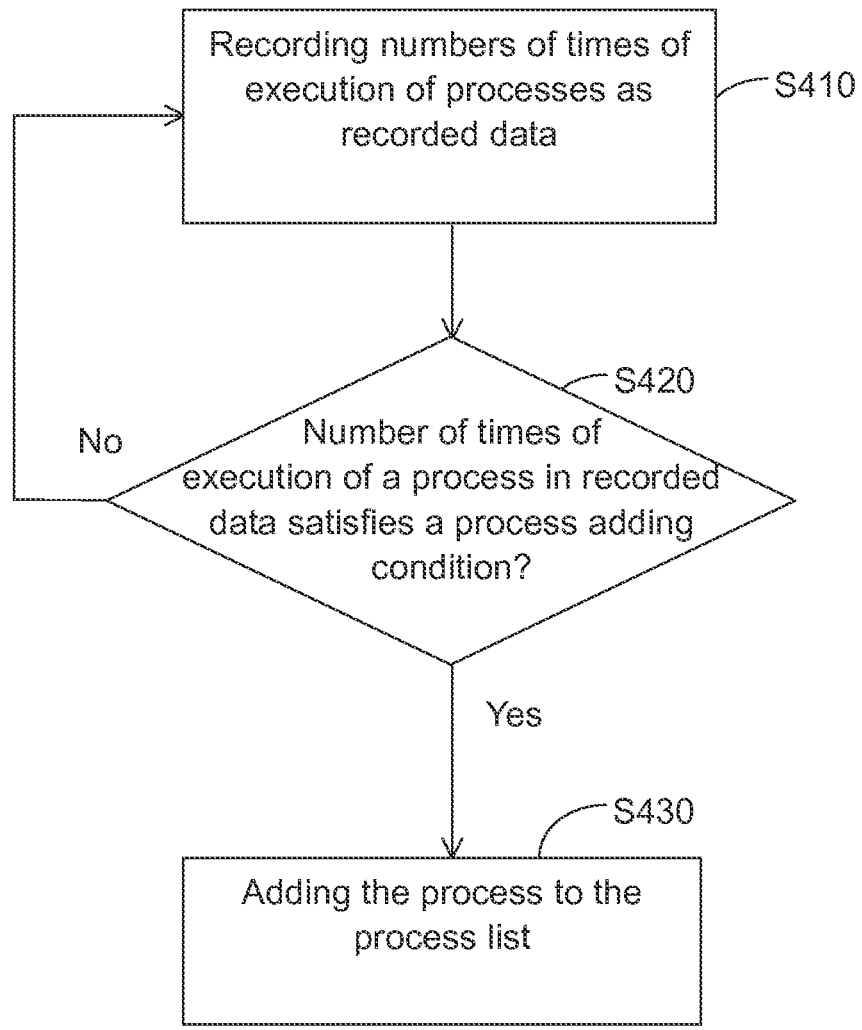
FIG. 5 is an example of designating process items to a process list according to an embodiment.

FIG. 5 shows an example of designating process items according to statistics according to an embodiment. The process in FIG. 5 is performed before step S110, i.e., when the system is under normal operation. In step S410, usage habits or execution behaviors such as the numbers of times of execution of processes of the computing apparatus are recorded as recorded data. In step S420, it is determined whether the number of times of execution of one process satisfies a process adding condition based on a threshold for times of execution, for example. If so, step S430 is performed to add the process to the process list, or else another process is proceeded, e.g., continuing the recording. Step S410 may be implemented by recording the numbers of times of execution with respect to all processes, only user processes, or only certain types of processes. The process adding condition in step S420 may further include other conditions, e.g., whether the process is associated with multimedia playback or network communication. Thus, the embodiments may provide the computing apparatus with a learning ability to further offer a personalized snapshot image for booting.

Figure 6:
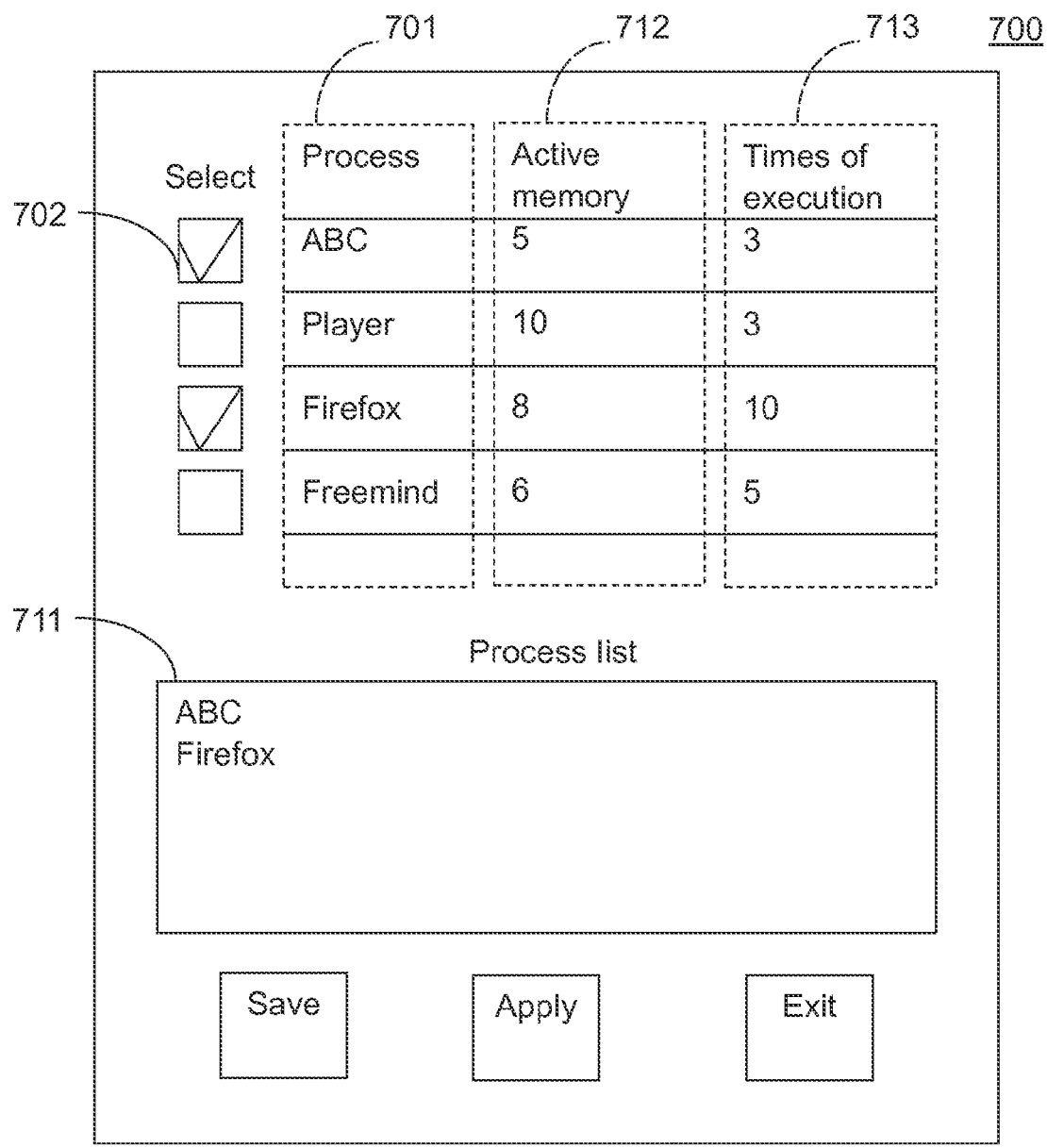
FIG. 6 is an example of designating process items to a process list by utilizing a user interface according to an embodiment.

FIG. 6 shows an example of designating process items through a user interface according to an embodiment. The example shown in FIG. 6 may be performed when the system is under normal operation, or before step S130 in FIG. 1. In the embodiment shown in FIG. 6, a user interface 700 is provided and presents indications of at least one process of the computing apparatus, e.g., process names ABC, Player, Firefox and Freemind shown in a region indicated by a dashed frame 701. Further, the computing apparatus, in response to a selection event (e.g., a selection made by way of a select box 702 or another other user interface), adds entries indicative of selected processes into the process list. In practice, other information such as a process list (e.g., 711), the active memory size (e.g., 712) or the number of times of execution (e.g., 713) of the at least one process can be selectively displayed to facilitate user selection of the process item that is to be added into or to be deleted from the process list. In addition to the approach of using a graphic user interface, the embodiment in FIG. 6 may be implemented in a command mode user interface. Further, the above selection operation may be regarded as entering a corresponding instruction into the computing apparatus.

A computing apparatus readable information storage medium is further provided according to an embodiment. The storage medium stores instructions in one or more programs or modules for executing the method in one of the above embodiments, as illustrated in FIGS. 1 to 6. For example, the computing apparatus readable storage medium is an optical information storage medium, (e.g., a CD, a DVD, or a blue-ray DVD, or the recordable or rewriteable one), a magnetic information storage medium (e.g., a floppy disk, a hard disk, or a magnetic tape disk), firmware, or a memory device (e.g., firmware, a flash memory, or a USB memory device). Further, the computing apparatus readable/writable information storage medium may also be a code transmittable via a network/transmission medium (e.g., air) or stored on a server.

Further, in some embodiments, for example, the foregoing specific boot mode is a fast-boot mode or a normal boot mode.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for generating a reduced snapshot image for booting, applied to a computing apparatus, comprising:
   in response to a shutdown request, determining whether a specific boot mode is enabled;
   assigning a threshold parameter set for process killing when the specific boot mode is enabled;
   if a first memory unit of the computing apparatus has at least one process satisfying a process killing condition, killing the at least one process satisfying the process killing condition, wherein the process killing condition includes a criterion based on the threshold parameter set; and
   entering a hibernation process, wherein the hibernation process generates a snapshot image for booting and stores the snapshot image to a second memory unit of the computing apparatus, and the snapshot image includes at least one process reserved in the first memory unit after the killing step.

2. The method according to claim 1, wherein after the killing step, the at least one process satisfying the process killing condition is not a system process.

3. The method according to claim 1, wherein the assigned threshold parameter set includes a priority threshold, and when the killing step is performed, the priority threshold causes the at least one process satisfying the process killing condition to be killed with respect to priority.

4. The method according to claim 1, wherein the assigned threshold parameter set includes a memory threshold for free memory size, and when the killing step is performed, the memory threshold causes the at least one process satisfying the process killing condition to be killed with respect to free memory size.

5. The method according to claim 1, wherein before the killing step, the method further comprises:
   determining whether there is any current process of the computing apparatus is indicated in a process list;
   increasing priority of at least one current process present in the process list when the at least one current process of the computing apparatus is indicated in the process list.

6. The method according to claim 5, wherein the increasing step enables the at least one current process with the increased priority to be reserved in the snapshot image after the killing step.

7. The method according to claim 6, wherein the increasing step enables a priority of the at least one current process to equal a priority of a kernel process of the computing apparatus, such that the at least one current process is reserved in the snapshot image after the killing step.

8. The method according to claim 1, wherein in the killing step, the process killing condition further includes a criterion based on a process list; and when a process in the first memory unit of the computing apparatus satisfies the criterion based on the assigned threshold parameter set and is not indicated in the process list, the process is killed.

9. The method according to claim 8, wherein before the step of determining whether the specific boot mode is enabled, the method further comprises:
   recording numbers of times of execution of processes in the computing apparatus as recorded data; and
   when the number of times of execution of a process indicated in the recorded data satisfies a condition based on a threshold for times of execution, adding an entry indicative of the process indicated in the recorded data to the process list.

10. The method according to claim 8, wherein before determining whether the specific boot mode is enabled, the method further comprises:
   providing a user interface for displaying at least one process of the computing apparatus; and
   in response to a selection operation, adding an entry indicative of a selected process of the at least one process to the process list.

11. The method according to claim 10, wherein the user interface further displays at least one of an active memory size and a number of times of execution of each of the at least one process being executed in the computing apparatus.

12. The method according to claim 10, wherein the user interface further displays the process list.

13. The method according to claim 1, wherein the killing step calls a memory killer of an operating system of the computing apparatus to perform process killing.

14. A non-transitory computing device readable storage medium, storing a plurality of executable instructions which, when executed by a computing device, cause the computing device to perform the method for generating a reduced snapshot image for booting according to claim 1.

15. A computing apparatus, comprising:
- a first memory unit;
- a second memory unit; and
- a processing unit, for assigning a threshold parameter set for process killing when a specific boot mode is enabled in response to a shutdown request, wherein when the first memory unit of the computing apparatus has at least one process satisfying a process killing condition, the processing unit kills the at least one process satisfying the process killing condition, wherein the process killing condition includes a criterion based on the assigned threshold parameter set;

wherein the processing unit, in response to the shutdown request, enables the computing apparatus to enter a hibernation state; and before the computing apparatus enters the hibernation state, the processing unit generates a snapshot image for booting and stores the snapshot image to the second memory unit, and the snapshot image includes at least one process reserved in the first memory unit after the processing unit kills the at least one process satisfying the process killing condition.

16. The computing apparatus according to claim 15, wherein the at least one process satisfying the process killing condition killed by the processing unit is not a system process.

17. The computing apparatus according to claim 15, wherein before killing the at least one process, the processing unit further increases a priority of at least one current process indicated in a process list, such that the at least one current process with the increased priority is reserved in the snapshot image.

18. The computing apparatus according to claim 15, wherein the process killing condition further includes a criterion based on a process list, and when a process in the first memory unit of the computing apparatus satisfies the criterion based on the assigned threshold parameter set and is not indicated in the process list, the processing unit kills the process.

19. The computing apparatus according to claim 18, wherein the processing unit, when operating under a normal operating state, further:
- records numbers of times of execution of processes in the computing apparatus as recorded data: and
- adds an entry indicative of a process indicated in the recorded data to the process list when the number of times of execution of the process indicated in the recorded data satisfies a condition based on a threshold for times of execution.

20. The computing apparatus according to claim 18, further comprising a display unit, wherein the processing unit, when operating under a normal operating state, further:
- provides a user interface for displaying at least one process of the computing apparatus in the display unit; and
- in response to a selection operation, adds an entry indicative of a selected process of the at least one process to the process list.

* * * * *